C. S. RENO.
ELECTRIC CONTROLLING MEANS.
APPLICATION FILED DEC. 12, 1907.
919,463.
Patented Apr. 27, 1909.
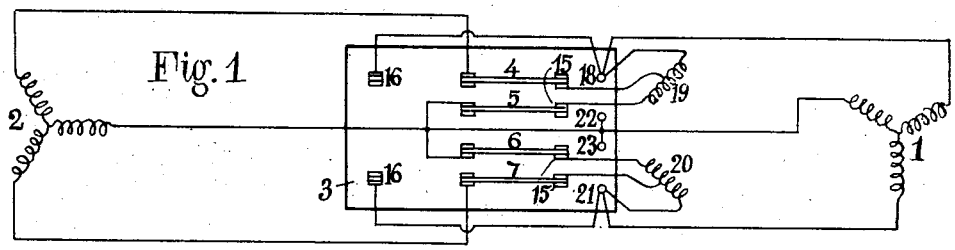
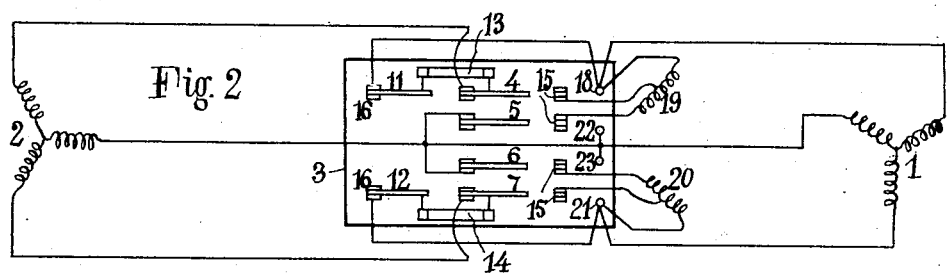
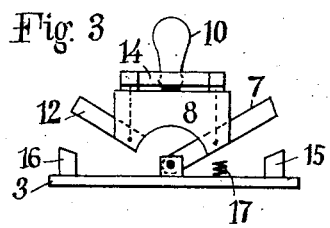
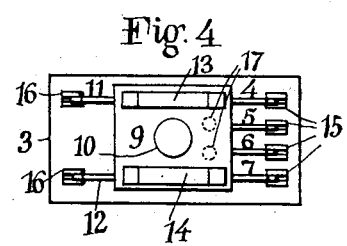
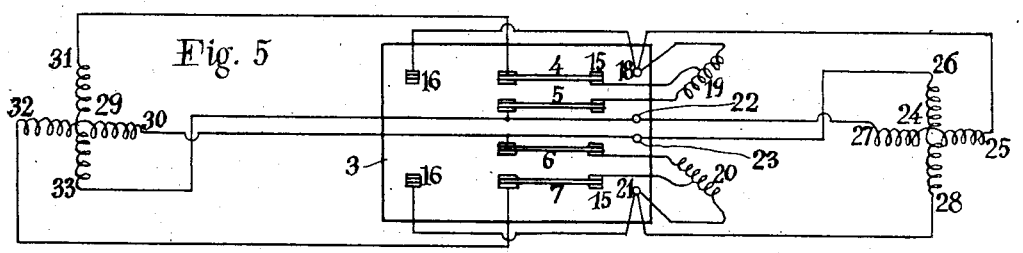
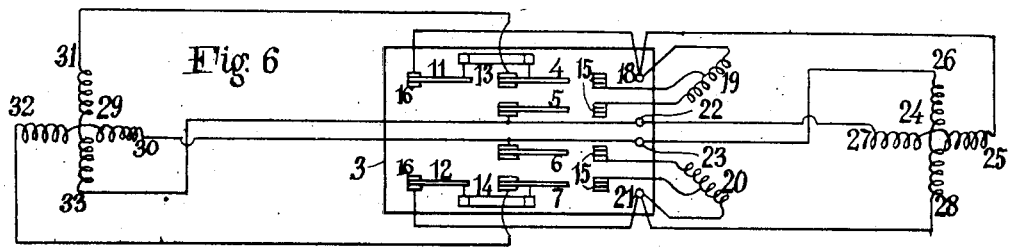

UNITED STATES PATENT OFFICE.

CHARLES STOWE RENO, OF CINCINNATI, OHIO, ASSIGNOR TO THE TRIUMPH ELECTRIC COMPANY, A CORPORATION OF OHIO.

ELECTRIC CONTROLLING MEANS.

No. 919,463.  Specification of Letters Patent.  Patented April 27, 1909.

Application filed December 12, 1907. Serial No. 406,176.

*To all whom it may concern:*

Be it known that I, CHARLES STOWE RENO, a citizen of the United States, residing at Cincinnati, in the county of Hamilton and State of Ohio, have invented certain new and useful Improvements in Electric Controlling Means, of which the following is a full, clear, and exact specification.

My invention relates to electric controlling means which is capable of use and application in various ways, but is particularly advantageous in connection with starting alternating current motors or in applying different alternating current voltages to one or more translating devices.

By means of my invention an electric motor may be conveniently and easily started and the apparatus required is of simple construction.

One feature of my invention relates to an arrangement of apparatus and connections whereby the voltage first applied to the motor or other translating device is less than the total electromotive force of the line and is then increased to the full voltage of the line. In the case of starting an alternating current motor, this has the advantage of securing a gradual increase in motor speed, and of taking comparatively small starting currents from the line.

Another feature of my invention secures the protection of the motor when the apparatus is in the final condition, but interruption of the circuits by the protective means is avoided during starting.

Other features and advantages of my invention will be understood by those skilled in the art from the following description and accompanying drawings.

Figures 1 and 2 are diagrams illustrating one embodiment of my invention; Figs. 3 and 4 are side and plan views respectively of one form of controlling switch; and Figs. 5 and 6 are diagrams illustrating another embodiment of my invention.

Referring to Figs. 1 to 4, I have indicated at 1 a three-phase source of alternating current energy, the windings being indicated as connected in star. At 2 are indicated the windings of a three-phase motor, the windings being shown also as connected in star.

Between the source and the motor are controlling means comprising a switch of the form shown in Figs. 3 and 4. This controlling switch comprises a base 3 which has pivoted thereto the switch blades 4, 5, 6, 7. These blades are each carried by a plate or bar 8 of fiber or other non-conducting material, which latter extends from a main portion 9 having a handle 10. At the opposite end of the support 9 are carried switch blades 11, 12 in a manner similar to the blades 4 to 7, and similarly insulated. On the main supporting part 9 are arranged two removable fuses 13, 14, the contacts or clips at one end of fuse 13 being electrically connected to the switch blade 11 and the contacts or clips at the other end of fuse 13 being electrically connected to the blade 4. Similarly, the contacts or contact at one end of the fuse 14 are electrically connected to the blade 12 and the contacts or contact at the other end of fuse 14 are electrically connected to blade 7 in any suitable manner, the latter connections being indicated in Fig. 3. When by means of the handle 10 the switch is thrown downward to the right, the blades 4, 5, 6, and 7 will engage contacts 15 mounted upon the base and the blades 11, 12 will then be out of connection with any contacts. When the controlling switch is thrown over to the left, the blades 4 to 7 will be disengaged from the contacts 15 and the blades 11, 12 will then make engagement with the contacts 16. The latter is the running position, and the former is the starting position for the motor. One or more springs 17 of any desirable form are provided which tend to force the controlling switch away from the starting position and unless the switch is held closed by the operator, the blades 4, 5, 6 and 7 will be thrown out of engagement with contacts 15.

The connections of the parts in starting position are shown in Fig. 1, whereas Fig. 2 shows the connections in running position. To a terminal connection 18 on the base 3 is connected one terminal of a compensator winding 19, the other terminal thereof being connected to the contact engaged by blade 5, and a tap from an intermediate point of said coil is connected to the contact engaged by switch blade 4. Similarly, one terminal of a compensator coil 20 is connected to a terminal contact 21 at one end and to the contact engaged by blade 6 at the other, a tap from an intermediate point being connected to the contact engaged by blade 7. The compensating coils 19, 20 are indicated as single transformer windings, but in some cases the double windings may be used and the coils 19, 20 will then form the secondary coils of transformers. Terminal 18 is connected to one of the three-phase supply mains, terminal 21 is connected to another of the supply mains, and terminals 22, 23 are connected together and to the remaining supply main. A connection extends from terminal 18 to the contact 16 engaged by blade 11, and a connection extends from terminal 21 to contact 16 engaged by blade 12. One of the three leads from the motor is connected to terminals 22, 23, another lead is connected to blade 4 through its pivot, and the remaining lead from the motor is connected to blade 7 through its pivot. Blades 5 and 6 are electrically connected together by a connection between their pivots. As above stated, when the controlling switch is thrown downward to the right from the position of Fig. 3, the blades 4 to 7 will engage contacts 15 and the connections will then be as shown in Fig. 1. In this position a comparatively low voltage will be applied to the motor windings, as will be understood by tracing the connections. For example, passing from one supply main the connection extends to terminal 18, thence through a part only of the compensator coil 19, through switch blade 4, and then to a terminal of the motor winding. Thus the voltage applied to the motor through the blade 4 is reduced from the line voltage by the difference in potential between the tap from coil 19 and the outer terminal of coil 19. Also in this position of the controlling switch, the circuit from another supply main passes to terminal 21, thence through a portion of coil, 20, to blade 7, and then to another terminal of the motor. The electromotive force applied to the motor by reason of this connection is therefore reduced from that of the line by an amount equal to the difference in potential between the intermediate tap of coil 20 and its outer terminal. The remaining supply main is connected directly to the remaining motor winding, but the resultant electromotive forces applied to the motor are considerably reduced compared with the electromotive forces of the supply mains. The motor will therefore start easily and gradually increase its speed.

After the motor has attained sufficient speed, the operator will throw the controlling switch by means of handle 10 disengaging the blades 4 to 7 from the contacts 15, and causing the blades 11 and 12 to engage the contacts 16, or if the operator releases the handle when the switch is in starting position, the springs 17 will cause the switch to be forced to running position; thus the release of the switch by the operator in starting position secures a rapid transfer to running position and which is quicker than can be accomplished by the operator. The connections for this running position are shown in Fig. 2, and for convenience in illustration, the fuses 13, 14 are indicated as being outside the switch blades. By tracing the connections it will be seen that the compensating coils 19, 20 are cut out of circuit and that the current from one supply main will pass to terminal 18, then to contact 16, through blade 11 and thence by the electrical connections through the fuse 13 to switch blade 4, and from its pivotal connection to one of the motor windings. Current from another supply main will pass to terminal 21, thence to the other contact 16, through blade 12 and by the electrical connections through fuse 14 and then through blade 7, through its pivotal connection to another terminal of the motor. Current from the remaining supply main will pass from the terminal connections on the base directly to the remaining motor winding. It will therefore be seen that the motor in this position of the controlling device is subjected to the full electromotive force of the line, and the motor will attain full speed. Also in this running position, the protecting devices 13, 14 are connected in circuit and upon the occurrence of any abnormal or excessive current, will cause the circuits to be broken and so protect the motor.

In Figs. 5 and 6, the same form of controlling means is indicated, the connections of the parts being adapted for a two-phase system.

A two-phase source is indicated at 24, having the windings interconnected if desired at their neutral points and the terminals being indicated at 25, 26, 27, 28. A two-phase motor is indicated at 29, the neutral points of the windings being interconnected if desired and having terminals 30, 31, 32, 33. By following the connections of Fig. 5 it will be seen that in the starting position, the main from terminal 25 of the source is connected to terminal 18, from which current will pass through a part of coil 19 out through the tap connection, through switch 4 and then to terminal 31 of the motor. Thus, by reason of the difference in potential of the tap from coil 19 from that of the supply main, the potential applied to terminal 31 of the motor will be correspondingly reduced from that of the supply main. Similarly, the potential applied to terminal 32 of the motor will be correspondingly reduced by reason of the connections from terminal 28 of the source passing to terminal 21, thence through a part of coil 20, through the tap and blade 7 to the terminal 32. The connection from terminal 27 of the source extends to terminal 22, and thence directly to terminal 33 of the motor; and connections from terminal 26 of the source extends to terminal 23, and thence directly to terminal 30 of the motor.

The switch blades 5 and 6 serve to complete the circuits from two of the supply mains through the compensating coils back to the respective or corresponding supply mains from the source, and similarly, in Fig. 1, the blades 5 and 6 serve to complete the circuits through the compensating coils from and to the source. It will thus be seen that with the connections of Fig. 5, the electromotive force to which the motor windings are subjected, is considerably less than the full electromotive forces of the supply mains, and the motor will therefore start easily and attain a certain speed.

When the controlling switch is thrown so as to disengage the blades 4 to 7 from contacts 15 and cause the blades 11 and 12 to engage the contacts 16, the connections will be as indicated in Fig. 6, the protective devices 13, 14 being indicated as located at the sides of the switch blades for convenience in illustration. By following the connections for this running position, it will be seen that the compensating coils are disconnected from all of the switch blades and that the connection from terminal 25 of the source extends to terminal 18, thence to one of the contacts 16 through blade 11 and fuse 13 on the movable element of the switch, and then through blade 4 to terminal 31 of the motor. Connection from terminal 28 of the source extends to terminal 21, then to the other contact 16, through blade 12, fuse 14 on the movable element of the switch and then through blade 7 to the terminal 32 of the motor. Connections from terminals 27 and 26 of the source extend to terminals 22 and 23 respectively, and then directly to terminals 33 and 30 respectively, of the motor. It will therefore be seen that the motor windings with these connections are subjected to the full electromotive force of the supply mains and the motor will operate at full speed.

Although I have indicated certain specific arrangements and connections in the accompanying drawings, it will be understood that they may be considerably varied in practice according to the particular conditions or requirements without departing from the scope of my invention. For example, instead of the connections from the source extending directly to the controlling apparatus, there may be introduced in the supply circuits transforming devices of any suitable character which in turn will supply energy to the controlling means and thence to the motor or other translating device. Also the connections or arrangement of windings of the source and motor may be arranged differently from those already indicated. Also the particular form of protective devices may be other than that already described, and the particular form of controlling switch instead of being a double throw switch, may be of other form, and it may sometimes be desirable to introduce more than one starting position and many other modifications may be introduced.

Having thus described my invention, I declare that what I claim as new and desire to secure by Letters Patent, is,—

1. The combination of a source of electric energy, a translating device, compensating windings, and a controlling switch for connecting said device through said windings to the source in one position and directly to mains from said source in another position, said controlling switch having protective devices carried by the movable element thereof and connected in circuit only when in said other position of the switch.

2. The combination of supply mains, a translating device, controlling means for applying electromotive force to said device less than the electromotive force of said mains, said controlling means comprising a double throw switch having a movable element, the said element having switch blades and protective devices each of said protective devices being connected to a plurality of said blades and carried by said element.

3. The combination of supply mains, a translating device, and controlling means for increasing the electromotive force applied to said device, said means comprising a switch having a movable element, and overload protective means carried by said movable element said protective means adapted to be thrown in circuit only when the controlling means is in running position.

4. The combination of supply mains, a translating device, controlling means for applying electromotive force to said device less than the electromotive force of said mains in a starting position and a higher electromotive force in running position, said controlling means comprising a manually operated controller having fixed and movable members so related that the off position is intermediate of the starting and running positions, and means independent of the current whereby said controller will be forced to running position when released in starting position and remain in running position.

5. The combination of supply mains, a translating device, controlling means for applying electromotive force to said device less than the electromotive force of said mains in a starting position and a higher electromotive force in running position, said controlling means comprising a manually operated controller having fixed and movable members, the movable member having an off-position between starting and running positions, and means whereby said controller is biased toward running position when in starting position but unbiased when in running position.

6. The combination of supply mains, a translating device, controlling means for applying electromotive force to said device less than the electromotive force of said mains in a starting position and a higher electromotive force in running position, said controlling means comprising a manually operated controller having fixed and movable members, the movable member having an off-position between starting and running positions, means whereby said controller is biased toward running position when in starting position but unbiased when in running position, an overload protective device carried by said movable member, and means whereby said protective device is connected in circuit in running position only.

7. The combination of alternating current supply mains, an electric motor, windings having taps, and a controlling switch for connecting said motor to said taps and then to the supply mains, said switch having a movable element, and a protective device carried by said element, said protective device so connected as to be thrown in circuit only when said controlling switch is in running position.

8. The combination of alternating current supply mains, an electric motor, windings having taps, and a controlling switch for connecting the motor to said taps and then to said mains, said switch having a movable element, and an overload protective device carried by said element, said protective device so connected as to be thrown in circuit only when said controlling switch is in running position.

9. The combination of alternating current mains, a translating device, windings having taps, a controlling switch for connecting said translating device to said taps and then to said mains, said switch having a movable element comprising switch blades, and overload protective means carried by said element, each of said protective means being electrically connected to a plurality of said blades.

10. The combination of alternating current mains, an electric motor, windings having taps, and a double throw switch for connecting said motor to said taps and then to said mains, said switch comprising a movable element having switch blades, and one or more fuses carried by said element, each of said fuses being connected to a plurality of said blades.

11. The combination of alternating current supply mains, an electric motor, and controlling means for increasing the electromotive force applied to said motor, said means comprising a controlling switch, said switch comprising a movable element, fixed contacts, and one or more fuses carried by said element, each of said fuses being electrically connected in series to a part of said movable element which engages one of said fixed contacts.

12. The combination of alternating current supply mains, an electric motor, windings having taps, a double throw switch having fixed contacts and a movable element having contacts coöperating with said fixed contacts, and adapted to be thrown in one direction for starting and in the opposite direction for running, an overload protective device carried by said movable element, connections whereby said device is connected in circuit in said running position only, and means whereby said movable element cannot be left in starting position.

13. A manually operated controller having off, starting, and running positions, the off position being intermediate the other positions, and means independent of the current whereby said controller will be forced to running position when released in starting position.

14. A manually operated controller, comprising fixed and movable elements, the starting position of said controller being immediately adjacent to the off-position, whereby said controller can be moved from off-position to starting position without passing through running position, and means independent of the current whereby said controller will be forced to running position when released in starting position.

In testimony whereof I affix my signature in presence of two witnesses.

CHARLES STOWE RENO.

Witnesses:
  D. D. GILL,
  C. S. UPSON.